Patented Feb. 7, 1939

2,145,893

UNITED STATES PATENT OFFICE 2,145,893

INVERTIZED SUGAR CRYSTALS

Reed W. Robinson, San Francisco, Calif., assignor of one-half to Andrew Olsen, Jr., San Francisco, Calif.

No Drawing. Application June 30, 1936,
Serial No. 88,110

3 Claims. (Cl. 127—30)

This invention relates to sugar and has for its principal object the production of a sucrose sugar in granulated or substantially granulated form in which the granules are coated with an enveloping layer of invert sugar or so-called invert syrup.

Another object of the invention is to provide an invert coated, or invertized sucrose sugar which will not agglomerate into hard masses, but will generally have the consistency of the so-called "brown sugar", and will simplify the making of cakes, candies and other sugar products where the sweetening properties of sucrose sugar is desired while at the same time the moisture-retaining nature of "brown sugar", or grain-retarding effect in making certain kinds of candies.

Other objects and advantages of the invention will appear in the following description.

In the manufacture of certain sweet food products it is the practice to incorporate together with white sugar (sucrose or saccharose) a quantity of invert sugar, or invert syrup as it is sometimes termed in the trade, the latter term being usually applied to invert sugar which contains a somewhat larger percentage of levulose than ordinary invert sugar and it is more fluid. Ordinary invert sugar is generally of a semi-solid or pasty mass analyzing about as follows:

| | Per cent |
|---|---|
| Sucrose | 2½ |
| Dextrose | 36 |
| Levulose | 36 |
| Water | Balance |

Invert sugar is hygroscopic to a certain degree and holds tenaciously to the water so that it is a valuable constituent in some kinds of bakery goods to prevent them from drying out, and in candy making, especially for smooth creamed type of candies it also aids in obtaining smoothness and prevents sugaring or grainedness, and also is particularly valuable in cake icings for both the above reasons.

However, invert sugar by reason of its consistency is difficult to measure out or weigh by the small baker or home baker and candy maker, and its advantages in the respects noted are therefore substantially limited to the larger manufacturers.

The present invention overcomes the difficulties or objections to the use of invert sugar by taking advantage of the fact that it is generally used in combination with common sugar, and that therefore a compound of the two materials to be handled in substantially dry form should meet the average requirement.

Experiments proved that ordinary granulated sugar could be made to carry from about 5 to 20% of invert sugar in the form of a coating on each granule or crystal of sugar or group of very fine granules; also that such a coating of a definite percentage can easily be maintained in the product so that it may be relied upon by the user. It forms a new product of the general consistency of the brown sugar of commerce, but is much sweeter to the taste.

In carrying out the invention, the common white granulated sugar is placed in a mixer, then the desired proportion—say from about 5 to 20% of the invert sugar, based on the weight of the white sugar—is first poured into the mixer while the machine is running, and the machine permitted to run until the granules or crystals of refined white sugar are each enveloped in a coating of the invert sugar. While the granules generally will be separate from one another, though more or less adherent like brown sugar, and some of the very fine particles will be agglomerated into larger particles, still the product will retain its general character as a loose granulated mass, easily measured out or weighed in any desired quantity for use in baking, icings or candy making.

To aid in the quick even coating of the white sugar with the invert sugar the mixer may be warmed when starting to mix but not enough to melt the white sugar, and after the mixing has been completed the mixer may be quickly chilled before stopping, or it may be emptied into a cold mixer and triturated until cool. It will keep in bags and ordinary container.

The above is but one way of coating the sugar as several other ways of coating granular materials known in the art may be used.

Having thus described my novel product and the preferred manner of making it, what I claim is:

1. A new article of manufacture comprising refined white sucrose sugar in granulated form in which the loose granules are coated with invert sugar.

2. A new article of manufacture comprising refined white sucrose sugar in granulated form in which the loose granules are coated with invert sugar, the invert sugar being in proportion of from about 5 to 20% by weight to the sucrose sugar.

3. A new article of manufacture comprising refined white sucrose sugar in loose granulated form and in which the crystals and groups of smaller particles are enveloped in a coating of invert sugar all in the form of a loose granular material.

REED W. ROBINSON.